United States Patent

Preiss

[11] Patent Number: 6,033,010
[45] Date of Patent: Mar. 7, 2000

[54] AIR GUIDING ARRANGEMENT FOR A MOTOR VEHICLE FRONT END

[75] Inventor: Michael Preiss, Vaihingen, Germany

[73] Assignee: Dr. Ing. h.c.F. Porsche AG, Weissach, Germany

[21] Appl. No.: 09/014,166

[22] Filed: Jan. 27, 1998

[30] Foreign Application Priority Data

Feb. 12, 1997 [DE] Germany ............................ 197 05 268

[51] Int. Cl.$^7$ ..................................................... B60J 1/00
[52] U.S. Cl. ..................................... 296/180.1; 296/180.5; 296/208
[58] Field of Search .............................. 296/180.1, 180.5, 296/208

[56] References Cited

U.S. PATENT DOCUMENTS

| 4,673,206 | 6/1987 | Kretschmer et al. ........................ 296/1 |
| 4,810,021 | 3/1989 | Burst ....................................... 296/180.1 |

FOREIGN PATENT DOCUMENTS

| 0 213 387 | 3/1987 | European Pat. Off. . |
| 2491857 | 3/1982 | France ................................. 296/180.1 |
| 35 42 376 | 6/1987 | Germany . |

Primary Examiner—Gary C. Hoge
Attorney, Agent, or Firm—Evenson McKeown Edwards & Lenahan, PLLC

[57] ABSTRACT

A vehicle-body-side air guiding device guides a first air current A such that it, is blown out directly in front of and exclusively in the area of the front wheels through blow-out openings provided on the bottom side of the vehicle in the direction of the roadway and, in the driving operation, forms an air wedge so that the air current B flowing through between the roadway and the bottom side of the vehicle is guided around the front wheels. So that the front wheel lift is not increased during the blowing-out of the air current, it is provided that, viewed in the flow direction of the air current, one deflection blade respectively is provided which is connected behind the blow-out openings and which deflects the air current emerging from the outlet openings toward the exterior side of the vehicle.

13 Claims, 3 Drawing Sheets

AIR GUIDING ARRANGEMENT FOR A MOTOR VEHICLE FRONT END

BACKGROUND AND SUMMARY OF THE INVENTION

This application claims the priority of German patent application 197 05 268.1 filed on Feb. 12, 1997, the disclosure of which is expressly incorporated by reference herein.

The invention relates to a motor vehicle having a front-end-side air guiding device.

An air guiding device is known from commonly assigned U.S. Pat. No. 4,673,206, the entire disclosure of which is expressly incorporated by reference herein. The front-end-side air guiding device guides a first air current through a cooler arranged on the body side, the current flowing out in the direction of the roadway through a blow-out opening arranged on the front end bottom part directly in front of the adjoining front wheel. In the driving operation, the first air current generates an air wedge in front of the front wheel, whereby a second air current guided through between the roadway and the vehicle bottom side is guided laterally around the front wheel. By the blowing-out of the first air current A having a lower kinetic energy directly in front of the front wheels, the second air current B having a larger kinetic energy is guided laterally around the front wheels, whereby the drag coefficient is reduced.

However, it is a disadvantage of this operating principle that the front axle lift is increased because the air current blown out toward the roadway causes a force component on the motor vehicle which is directed upward.

It is an object of the invention to provide an air guiding device that essentially maintains the improved flow around the front wheels while reducing or avoiding a lift-causing force component at the front wheels.

This and other objects have been achieved according to the present invention by providing an air guiding arrangement for a motor vehicle front end, comprising: an air guiding structure defining an air duct extending transversely in front of a front wheel of the motor vehicle, said air guiding structure defining a forward-facing inlet opening which communicates with said air duct, said air guiding structure defining a blow-out opening at a lower side of said air duct in front of said front wheel; and a deflection blade arranged adjacent said blow-out opening and exterior of said air duct, a surface of said deflection blade which faces said blowout opening being inclined toward a lateral side of the motor vehicle.

This and other objects have been achieved according to the present invention by providing an air guiding arrangement for a motor vehicle front end having an air guiding structure defining an air duct extending transversely in front of a front wheel of the motor vehicle, said air guiding structure defining an forward-facing inlet opening which communicates with said air duct, said air guiding structure defining a blow-out opening at a lower side of said air duct in front of said front wheel, said air guiding arrangement comprising: a deflection blade arranged adjacent said blow-out opening and exterior of said air duct, a surface of said deflection blade which faces said blow-out opening being inclined toward a lateral side of the motor vehicle.

This and other objects have been achieved according to the present invention by providing a method of manufacturing an air guiding arrangement for a motor vehicle front end having an air guiding structure defining an air duct extending transversely in front of a front wheel of the motor vehicle, said air guiding structure defining an forward-facing inlet opening which communicates with said air duct, said air guiding structure defining a blow-out opening at a lower side of said air duct in front of said front wheel, said method comprising: arranging a deflection blade adjacent said blow-out opening and exterior of said air duct, such that a surface of said deflection blade which faces said blowout opening is inclined toward a lateral side of the motor vehicle.

The principal advantages achieved by means of the invention are that, because of the arrangement of a deflection blade provided on the side of the front-end bottom part facing the roadway behind the blow-out opening, the blown-out air current is diverted toward the vehicle side, whereby the lift-causing force component is eliminated.

In addition to deflecting the air current, the occurring impulse of the first air current A results in a force component in the downward direction and thus in a reduced front axle lift.

The air-guiding function of this deflection blade, which is preferably arranged in parallel to the flow direction equalizes losses in the Cd (drag coefficient) factor which are the result of the fact that the effect of the blow-out current on the drag cannot be optimally maintained by the deflection.

In addition, by the arrangement of the deflection blades in front of the blow-out openings, the brake cooling is increased by approximately 15 to 20%. Because of the clearance above the road surface and the danger of damage, the deflection blades are preferably made of an elastic material and are connected with the bottom part of the front end by screwing, adhesive, spraying-on, or the like.

Other objects, advantages and novel features of the present invention will become apparent from the following detailed description of the invention when considered in conjunction with the accompanying drawings.

DETAILED DESCRIPTION OF THE DRAWINGS

Figure 1:
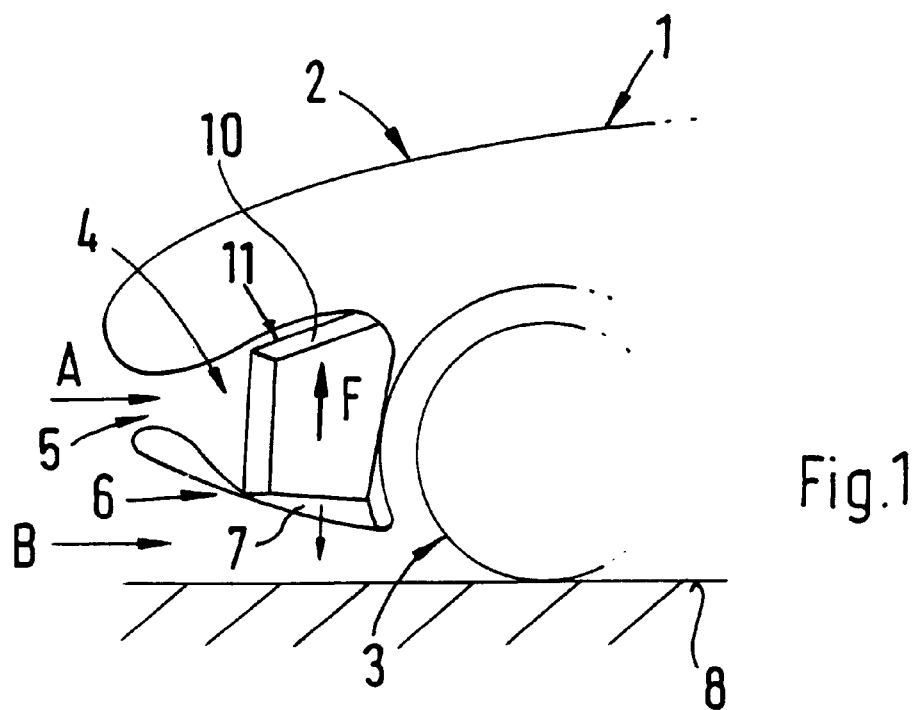
FIG. 1 is a partial lateral view of a forward area of a passenger car having a front-end-side air guiding device known from the state of the art.

In the illustrated area, the motor vehicle 1 formed by a passenger car has a vehicle body 2 and front wheels 3. Inside the vehicle body 2, a duct-shaped air guiding device 4 for a first air current A is provided. By way of a front-end-side inlet opening 5, this air current A arrives in the air guiding device 4, flows through it and is guided to a blow-out opening 7 provided on the bottom side 6 of the vehicle. Then the first air current A is combined with a second air current B flowing through between the vehicle bottom side 6 and the roadway 8.

So that the second air current B can flow through at a low turbulence between the vehicle bottom side 6 and the roadway 8, the vehicle bottom side 6 is provided with an aerodynamically constructed smooth-surface covering part. The covering part is formed by a front-end bottom part 9 in the forward area. In order to avoid a direct flow against the front wheels 3 by the air current B, the blow-out openings 7 for the first air current A arranged on the front-end bottom part 9 are provided directly in front of and exclusively in the area of the front wheels 3.

Inside the air guiding device 4, a device 11 for reducing the flow rate of the first air current A is arranged which is formed by a cooler 10 so that the first air current A behind the blow-out opening 7 has a lower kinetic energy than the second air current B passing through between the vehicle bottom side 7 and the roadway 8. However, a higher pressure level exists in the case of a first air current A than in the case of the second air current B; that is, the first air current A forms an upright, guide-body-type cushion (air wedge) in front of the front wheels 3 around which the second air current B is laterally guided. By the blowing-out of the air current A in front of the front wheels 3, the flowing around is aerodynamically improved.

Figure 2:
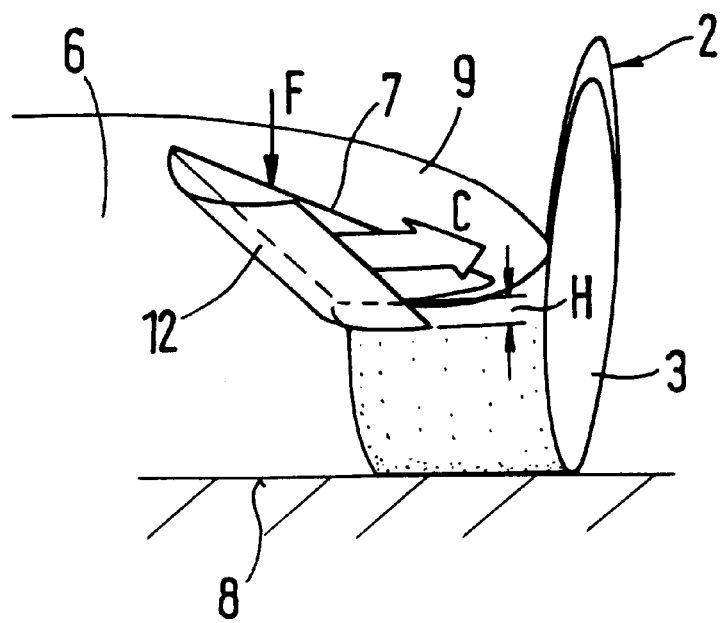
FIG. 2 is a view diagonally from the front of the blow-out opening of the air guiding device arranged in front of the front wheel and of the deflection blade according to a preferred embodiment of the present invention.

So that, during the blowing-out of the air current A, a lift-causing force component F (as illustrated in the case of the state of the art according to FIG. 1) is avoided, it is provided according to the invention that, on the side of the front-end bottom part 6 facing the roadway 8, a deflection blade 12 is arranged in the area of each blow-out opening 7 which deflects the blown-out air current A toward the vehicle side C. As the result of the deflection blade 12, the lift-causing force component is eliminated. The occurring impulse of the cooler exhaust air current (corresponding to air current A) results in a force component in the downward direction and thus to a reduced front axle lift (see FIG. 2). The air-guiding function of the deflection blade 12 which is preferably arranged in parallel to the flow direction equalizes losses in the Cd (drag coefficient) factor which are the result of the fact that the effect of the blow-out current A on the drag cannot be optimally maintained by the deflection.

Because of the danger of damage occurring in the bottom area and the clearance between the vehicle and the road, the deflection blade 12 is preferably made of a flexible material (such as rubber, plastic or the like and has a relatively thin-walled construction (for example, tin). The deflection radius R of the deflection blade 12 should preferably correspond to the height K, in which case the radius should however not be less than 10 mm.

Figure 3:
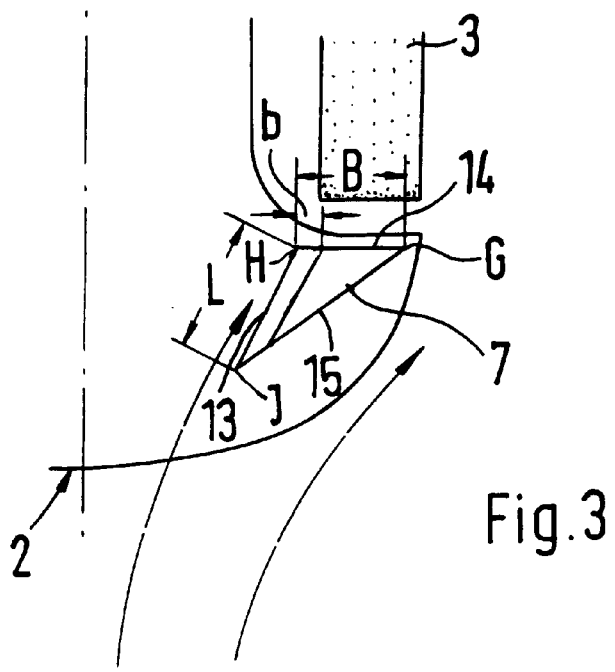
FIG. 3 is a partial top view of the front-end area of the passenger car with the blow-out opening and the deflection blade.

According to FIG. 3, a blow-out opening 7 is provided which, in the top view, is approximately triangular, the corner points of the blow-out opening in FIG. 3 being marked G, H and J. The first boundary edge 13 of the blow-out opening 7, which connects the corner points H and J, is oriented toward the center of the vehicle, whereas the second boundary edge 14 defined by the corner points H and G extends approximately in the transverse direction of the vehicle. The third boundary edge 15 extends diagonally from the interior front to the exterior rear and connects the corner points J and G.

The deflection blade 12, which is preferably arranged in parallel to the locally existing current, is positioned on the boundary edge 13 of the blow-out opening 7 which is oriented toward the vehicle center. This deflection blade 12 is at least as long as this edge. The wider b the construction of the deflection blade 12, the more the front axle lift can be reduced. However, an exceeding of the width W of the blow-out opening is hardly useful. Starting at approximately half the width of the blow-out opening, the increase of the width results in a rise of the drag. For this reason, it hardly makes any sense to dimension the deflection blade 12 wider than half the width of the blow-out opening. In addition, the cooling air flow rate will then be limited in a function-impairing manner.

The higher K the construction of the deflection blade 12, the more the front axle lift can be reduced. Up to a blade height of 30 mm, the height K has no disadvantageous effect on the drag. Beyond that, the drag will rise with an increasing height. The leg height which is optimal for a vehicle is a matter of the layout with respect to the requirement of the front axle lift and the still acceptable loss of drag. The height K defines the clearance between the front end bottom part 9 and the deflection blade 12.

Figure 4:
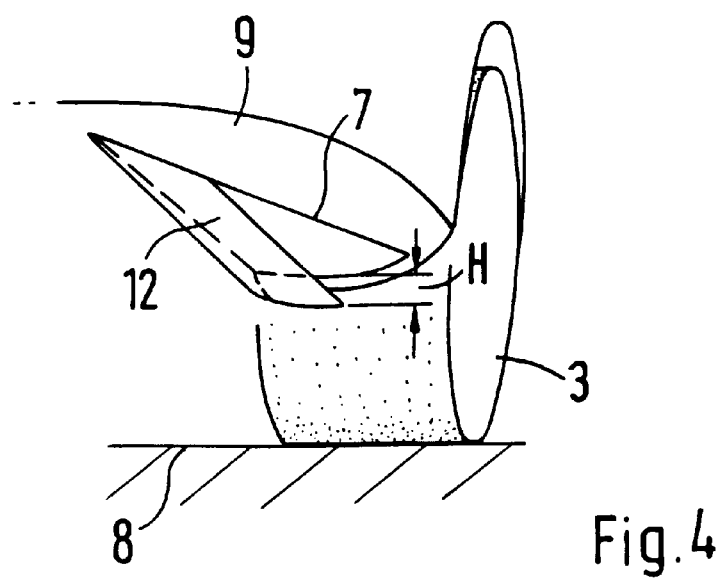
FIG. 4 is a view corresponding to FIG. 2 of another embodiment of the deflection blade.
Figure 5:
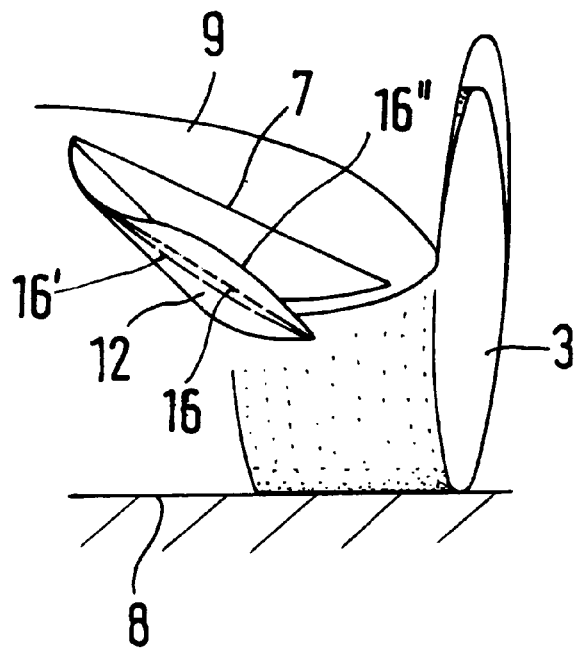
FIG. 5 is a view corresponding to FIG. 2 with different alternatives with respect to the cut of the blade edge pointing to the exterior side of the vehicle.
Figure 6:
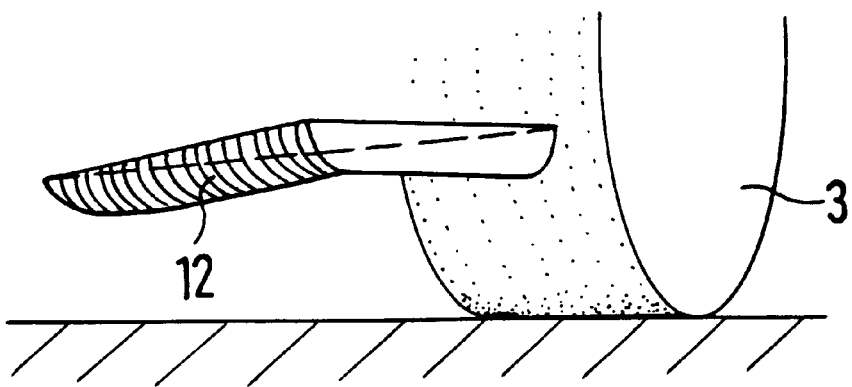
FIG. 6 is a view corresponding to FIG. 2, in which case, on its rearward end, the deflection blade is combined with a conventional front wheel spoiler.

Because of a defined overhang angle, the blade height according to FIG. 4 may rise starting in the front at zero to the desired height at the end. This results in only small losses of the aerodynamic capacity. The cut of the blade edge pointing to the exterior side of the vehicle, if required because of the package (overhang angle), may take place diagonally in a straight line, diagonally convexly or diagonally concavely. In FIG. 5, the three different cuts of the blade edge pointing to the exterior side of the vehicle are marked with the reference numbers 16, 16' and 16". At the rearward end, the deflection blade 12 may be connected with a conventional front wheel spoiler. This may take place by a mechanical connection or may be shown in one piece. As a result, an advantageous reinforcement of the deflection blade can be achieved.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An air guiding arrangement for a motor vehicle front end, comprising:
    an air guiding structure defining an air duct extending transversely in front of a front wheel of the motor vehicle, said air guiding structure defining a forward-facing inlet opening which communicates with said air duct, said air guiding structure defining a blow-out opening at a lower side of said air duct in front of said front wheel; and
    a deflection blade arranged adjacent said blowout opening and exterior of said air duct, a surface of said deflection blade which faces said blow-out opening being inclined toward a lateral side of the motor vehicle.

2. An air guiding arrangement according to claim 1, wherein a forward movement of said motor vehicle generates a first air current which flows into said air duct via said inlet opening and flows out of said air duct via said blow-out opening, and wherein said forward movement of said motor vehicle generates a second air current which flows below said air guiding structure, said deflection blade being arranged such that said first air current generates an air wedge in front of the front wheel such that said second air current is guided laterally around the front wheel.

3. An air guiding arrangement according to claim 1, wherein a cooler is arranged in said air duct.

4. A motor vehicle according to claim 1, wherein the deflection blade is manufactured of a flexible material.

5. A motor vehicle according to claim 1, wherein the deflection blade is screwed to a bottom side of the air guiding structure.

6. A motor vehicle according to claim 1, wherein the deflection blade is adhesively connected to a bottom side of the air guiding structure.

7. A motor vehicle according to claim 1, wherein the deflection blade is positioned on a boundary edge of the air guiding structure defining the blow-out opening, said boundary edge being oriented toward a center of the motor vehicle, said deflection blade being at least as long as the boundary edge.

8. A motor vehicle according to claim 1, wherein the deflection blade is arranged in parallel to a locally existing current.

9. A motor vehicle according to claim 1, wherein a width of the deflection blade is approximately one-half of a width of the blow-out opening.

10. A motor vehicle according to claim 1, wherein a deflection radius of the deflection blade preferably corresponds approximately to a height of the deflection blade.

11. An air guiding arrangement for a motor vehicle front end having an air guiding structure defining an air duct extending transversely in front of a front wheel of the motor vehicle, said air guiding structure defining an forward-facing inlet opening which communicates with said air duct, said air guiding structure defining a blow-out opening at a lower side of said air duct in front of said front wheel, said air guiding arrangement comprising:

a deflection blade arranged adjacent said blowout opening and exterior of said air duct, a surface of said deflection blade which faces said blow-out opening being inclined toward a lateral side of the motor vehicle.

12. A method of manufacturing an air guiding arrangement for a motor vehicle front end having an air guiding structure defining an air duct extending transversely in front of a front wheel of the motor vehicle, said air guiding structure defining an forward-facing inlet opening which communicates with said air duct, said air guiding structure defining a blow-out opening at a lower side of said air duct in front of said front wheel, said method comprising:

arranging a deflection blade adjacent said blow-out opening and exterior of said air duct, such that a surface of said deflection blade which faces said blow-out opening is inclined toward a lateral side of the motor vehicle.

13. A method according to claim 12, wherein a forward movement of said motor vehicle generates a first air current which flows into said air duct via said inlet opening and flows out of said air duct via said blow-out opening, and wherein said forward movement of said motor vehicle generates a second air current which flows below said air guiding structure, said deflection blade being arranged such that said first air current generates an air wedge in front of the front wheel such that said second air current is guided laterally around the front wheel.

* * * * *